United States Patent
Reissman et al.

(10) Patent No.: US 7,477,785 B2
(45) Date of Patent: Jan. 13, 2009

(54) FUZZY IMAGE COMPARATOR

(75) Inventors: Pierre-Jean Reissman, Villefranche sur Mer (FR); Marc Cauchy, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 844 days.

(21) Appl. No.: 10/993,538

(22) Filed: Nov. 19, 2004

(65) Prior Publication Data
US 2006/0110047 A1    May 25, 2006

(51) Int. Cl.
*G06K 9/68* (2006.01)

(52) U.S. Cl. .................. 382/221; 382/168; 382/191; 382/260; 382/278; 382/280

(58) Field of Classification Search .............. 348/246, 348/250; 382/168, 191, 218, 221, 260, 275, 382/278, 280, 286, 192
See application file for complete search history.

(56) References Cited

U.S. PATENT DOCUMENTS

| | | | |
|---|---|---|---|
| 5,390,133 A | | 2/1995 | Sohie |
| 5,550,937 A * | | 8/1996 | Bell et al. .................. 382/293 |
| 5,703,961 A | | 12/1997 | Rogina |
| 5,982,941 A * | | 11/1999 | Loveridge et al. ........... 382/260 |
| 6,008,820 A * | | 12/1999 | Chauvin et al. ............. 345/502 |
| 6,373,983 B1 * | | 4/2002 | Tsai ........................ 382/192 |
| 6,385,342 B1 * | | 5/2002 | de Queiroz ................. 382/233 |
| 6,542,626 B1 * | | 4/2003 | Brouwer et al. ............. 382/128 |
| 6,606,407 B1 * | | 8/2003 | Takahashi et al. ........... 382/164 |
| 6,628,708 B1 * | | 9/2003 | Sampson ................... 375/240.1 |
| 6,650,779 B2 * | | 11/2003 | Vachtesvanos et al. ...... 382/228 |
| 6,721,461 B1 * | | 4/2004 | Nichani .................... 382/270 |
| 6,736,478 B2 * | | 5/2004 | Franzke et al. .............. 347/19 |
| 6,795,118 B1 * | | 9/2004 | Cho ........................ 348/246 |
| 6,888,572 B1 | | 5/2005 | Kozlowski |
| 6,888,577 B2 | | 5/2005 | Waki |
| 7,024,041 B2 * | | 4/2006 | Sasa ....................... 382/221 |
| 7,095,908 B2 | | 8/2006 | Jarvis |
| 7,200,251 B2 | | 4/2007 | Joshi |
| 7,302,677 B2 | | 11/2007 | Reissman |
| 7,379,618 B2 * | | 5/2008 | Motomura et al. .......... 382/274 |
| 7,379,627 B2 | | 5/2008 | Li |

(Continued)

OTHER PUBLICATIONS

Office Action dated Apr. 4, 2008 cited in related U.S. Appl. No. 10/993,751 (Copy Attached).

(Continued)

*Primary Examiner*—Gregory M Desire
(74) *Attorney, Agent, or Firm*—Workman Nydegger (57) ABSTRACT

A system and method for improved image comparison is provided. An adjustable tolerance level may be set for comparing the images, and filtering may be applied to the images, for example, to suppress high frequencies in the images or to enhance low frequencies in the images. Furthermore, a geometrical transform, such as a 2D affine transform, may be applied to one of the images. The pixels of one of the images may be compared with corresponding pixels of another image to detect differences between the pixels compared. Then the outcome of comparing the pixels of the images may be determined by comparing the differences detected with the tolerance level set. The tolerance may be set by selecting one of a set of predefined tolerance levels, each of which may represent a different degree of tolerance to be used in comparison of the images.

14 Claims, 6 Drawing Sheets

U.S. PATENT DOCUMENTS

| | | | |
|---|---|---|---|
| 2004/0066962 A1* | 4/2004 | Sasa et al. | 382/141 |
| 2005/0069207 A1 | 3/2005 | Zakrewski | |
| 2006/0110043 A1* | 5/2006 | Reissman | 382/203 |
| 2006/0110044 A1* | 5/2006 | Reissman | 382/203 |
| 2006/0110045 A1* | 5/2006 | Reissman | 382/203 |
| 2006/0110047 A1* | 5/2006 | Reissman et al. | 382/218 |
| 2008/0056564 A1* | 3/2008 | Lindbloom | 382/162 |

OTHER PUBLICATIONS

Office Action dated Mar. 20, 2008 cited in related U.S. Appl. No. 10/993,675 (Copy Attached).

Office Action dated Sep. 11, 2008 cited in U.S. Appl. No. 10/993,537 (Copy Attached).

Office Action dated Sep. 12, 2008 cited in U.S. Appl. No. 10/993,675 (Copy Attached).

* cited by examiner

FUZZY IMAGE COMPARATOR

CROSS-REFERENCE TO RELATED APPLICATIONS

The present invention is related to the following copending United States Patent Applications filed concurrently herewith, assigned to the assignee of the present invention, and hereby incorporated by reference in their entireties:

"System and Method for Validating Graphical Components of Images," U.S. application Ser. No. 10/993,751;

"System and Method for Validating Graphical Components of Images by Analysis," U.S. application Ser. No. 10/993,537; and "System and Method for Validating Graphical Components of Images by Synthesis," U.S. application Ser. No. 10/993,675.

FIELD OF THE INVENTION

The invention relates generally to computer systems, and more particularly to an improved system and method for comparing images using fuzzy image comparison.

BACKGROUND OF THE INVENTION

Software development usually requires testers to evaluate the quality of a software product in many ways, including any content such as images incorporated in a software build or generated by execution of a software build. Traditional testing of such images may involve verifying that every pixel of a test candidate image is identical to the corresponding pixel of a master image. A typical validation algorithm may directly compare each pixel of a test candidate image to a corresponding pixel in the master image and then decide to pass or fail the test candidate image based upon the number of direct pixel comparison failures. The problem with this approach is that the comparison may fail from numerous slight differences that may not be visible by human perception.

Another problem with this approach is that it does not account for noise that may be introduced into an image such as by disk drive controllers in accessing the image from persistent storage or by rendering drivers in rendering an image retrieved from storage. Based on the specifics of the system, some other common sources of noise may include rounding errors due to the high precision of the computations, differences in bit representation of the image format, visually detectable artifacts such as salt and pepper noise from spurious pixels, information missing from the image or extraneous information added to the image, and so forth. In any of these cases, a direct pixel comparison approach may often fail where noise has been introduced in the image.

Additionally, differences in the implementations of graphics hardware and software drivers, including renderers, may create differences in two rendered images. For example, rounded corners in an image may be rendered as square corners. As another example, firmware in an implementation may render red as a shade of red or reddish. Again, a direct pixel comparison approach may often fail from the accumulation of defects arising from differences that may be generated by various implementations of graphics hardware and software.

What is needed is a more flexible and adjustable system for comparing images. Such a system should be able to compensate for noise introduced into an image as well as allow for adjustable control of the resolution of an image.

SUMMARY OF THE INVENTION

Briefly, the present invention provides an improved system and method for comparing images. To this end, the present invention may preprocess images to be compared, including setting an adjustable tolerance level for comparing the images, compare pixels of one of the images with corresponding pixels of another image to detect differences between the pixels compared, and then determine the outcome of comparing the pixels of the images by comparing the differences detected with the tolerance level set. As part of preprocessing the images, the system and method may filter the images, for example, to suppress high frequencies in the images or to enhance low frequencies in the images or to test the filters in effect in the graphic pipeline under test if they exist. Furthermore, a geometrical transform, such as a 2D affine transform, may be applied to one of the images during preprocessing of the images in order to test the 2D affine transform of the graphic pipeline under test if it exists.

The system may provide a tolerance adjuster for setting an adjustable tolerance level, a pixel comparator for comparing pixels of one image with corresponding pixels of another image to detect differences between the pixels compared, and a results manager for determining the outcome of comparing the pixels of the images by comparing the differences detected with a set tolerance level. A user interface may be provided that has an application programming interface for setting the tolerance level. Additionally, one or more filtering engines may be provided for filtering the images, and one or more transform engines may be provided for performing a geometric transform on one of the images.

The present invention may advantageously provide a fuzzy comparator by supporting the capability for image filtering, image transforms, and an adjustable tolerance. In one embodiment, the tolerance may be set by selecting one of a set of predefined tolerance levels, each of which may represent a different degree of tolerance to be used in comparison of the images. For example, a set of tolerance levels may be created such as very fuzzy, tolerant, strict and very strict. This may be particularly useful for processing different types of images such as content images, a series of graphical user interface screens, visual primitives, and so forth. Furthermore, filtering of the images may allow information from high-level frequencies to be distributed into lower frequencies or information from lower frequencies to be enhanced for performing fuzzy image comparison.

In general, the system and method offer flexible matching and resolution control for comparing any number of different image types. Other advantages will become apparent from the following detailed description when taken in conjunction with the drawings, in which:

DETAILED DESCRIPTION

Exemplary Operating Environment

Figure 1:
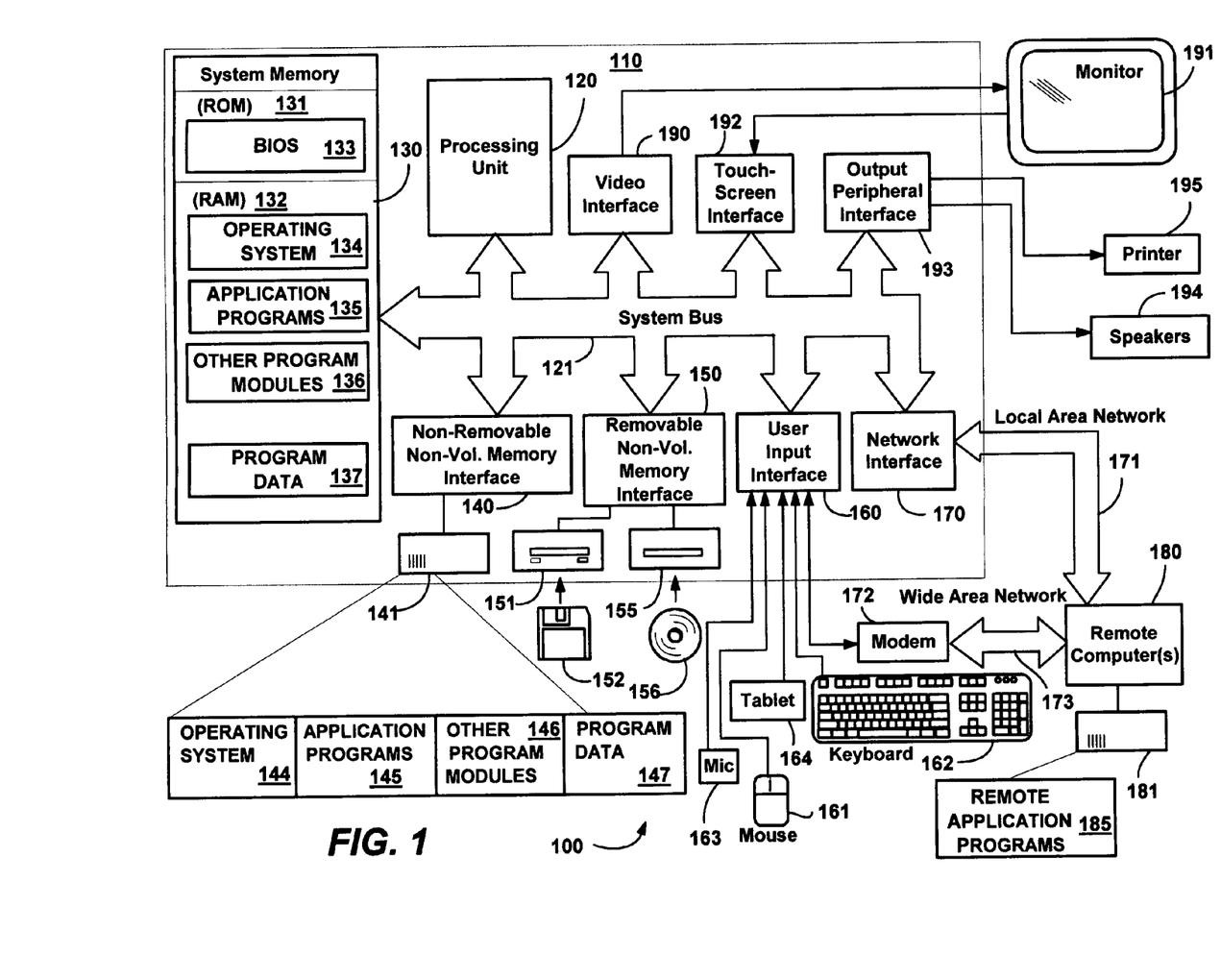
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, headless servers, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated a storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or other devices including a device that contains a biometric sensor, environmental sensor, position sensor, or other type of sensor. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 194 and printer 195, which may be connected through an output peripheral interface 193 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Fuzzy Image Comparison

The present invention is generally directed towards an improved system and method for comparing images using fuzzy image comparison. Advantageously, the system and method offer flexible matching and resolution control of images for any number of applications. For instance, the present invention may be used to validate images in a software build. The software build may include a set of executable assemblies which may generate images rendered by the software on a screen or display such as a sequence of graphical user interface screens. As defined herein, an image means any visual media such as a video image, a part of an image, a graphical user interface screen, any visual primitives to build a graphical user interface screen including, a control, a frame, a window, and so forth. A master image may be generated, for instance upon test creation or at runtime, and then compared to the images of subsequent builds using the present invention. As will be understood, the various block diagrams, flowcharts, illustrations and scenarios described herein are only examples, and there are many other scenarios to which the present invention will apply.

Figure 2:
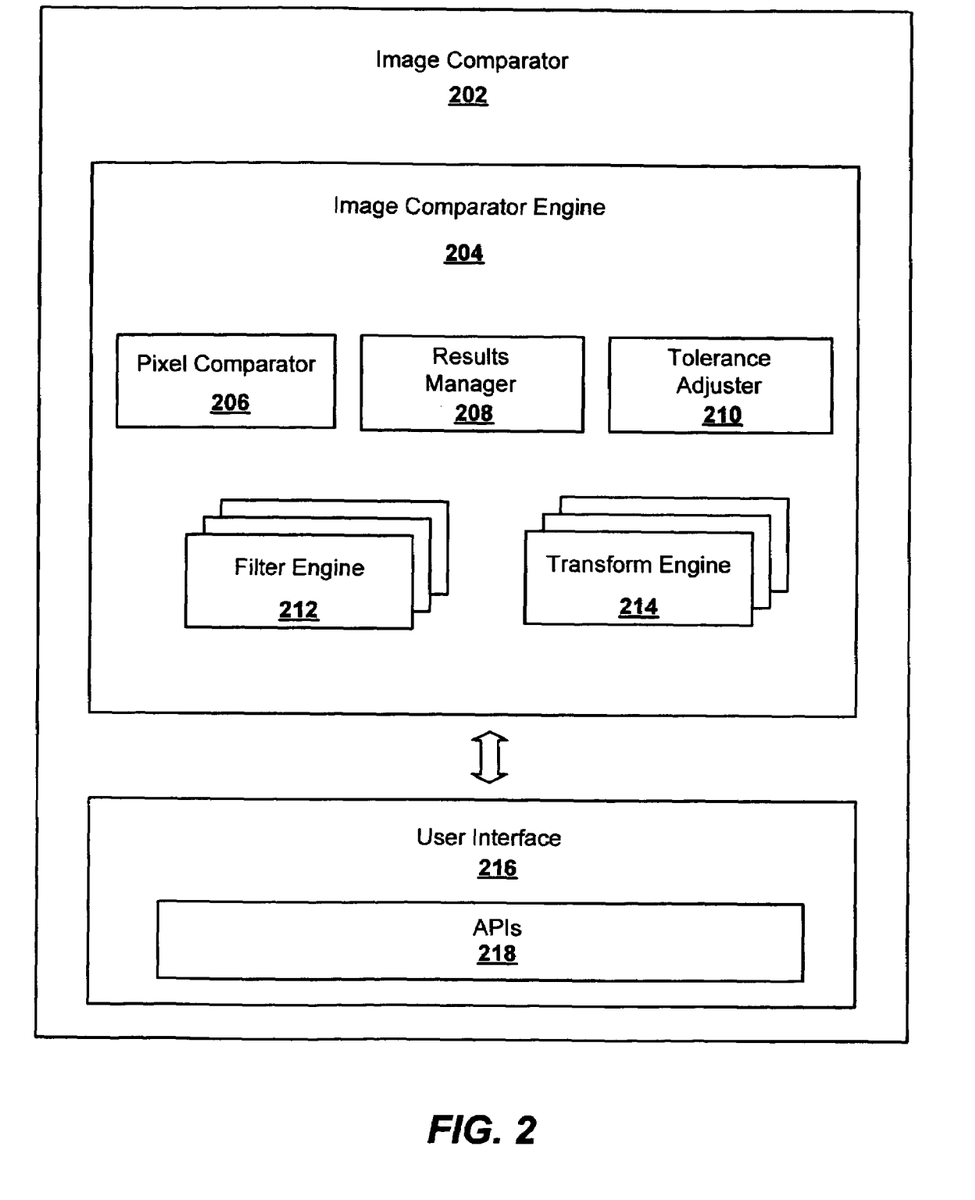
FIG. 2 is a block diagram generally representing an exemplary architecture of system components for a fuzzy image comparator, in accordance with an aspect of the present invention.

Turning to FIG. 2 of the drawings, there is shown a block diagram generally representing an exemplary architecture of system components for a fuzzy image comparator. Those skilled in the art will appreciate that the functionality implemented within the blocks illustrated in the diagram may be implemented as separate components or the functionality of several or all of the blocks may be implemented within a single component. For example, the functionality for the user interface 216 may be included in the image comparator engine 204, or the functionality of the transform engine 214 may be implemented as a separate component.

The image comparator 202 may accept any image, including any visual primitive used in a graphical user interface. The image comparator 202 may include an operably coupled image comparator engine 204 and an operably coupled user interface 216. In general, the image comparator engine 204 and the user interface 216 may be any type of executable software code such as a kernel component, an application program, a linked library, an object, and so forth. The user interface 216 may include application programming interfaces such as APIs 218. The image comparator engine 204 may include an operably coupled pixel comparator 206, an operably coupled results manager 208, an operably coupled tolerance adjuster 210, one or more operably coupled filter engines 212 and one of more operably coupled transform engines 214. Each of these components may also be any type of executable software code such as a kernel component, an application program, a linked library, an object, or other type of executable software code.

The pixel comparator 206 may compare the pixels of images and the results manager 208 may record the results of pixel comparisons. The tolerance adjuster 210 may set an adjustable tolerance level used for determining the outcome of the results of the pixel comparisons. In one embodiment, pixels of one image may be compared to the corresponding pixels in another image and a histogram may be formed for recording the results of the pixel comparisons. Before pixel comparison may be performed, any filter engine 212 may be used to filter an image in the frequency or the spatial domain. Any filters known to those skilled in the art may be used including without limitation a low-pass filter, a Laplacian filter, Gaussian filter, and so forth. For example, a filter may be applied to the images to suppress high frequencies in the image or enhance low frequencies in the image. Furthermore, any transform engine 214 may apply any type of geometrical transform to an image, including translation, rotation, scaling and other 2D affine transforms. In one embodiment, a transform may only be applied to the test candidate image. Those skilled in the art will appreciate that any sequence of filters or transforms may be applied to an image.

Figure 3:
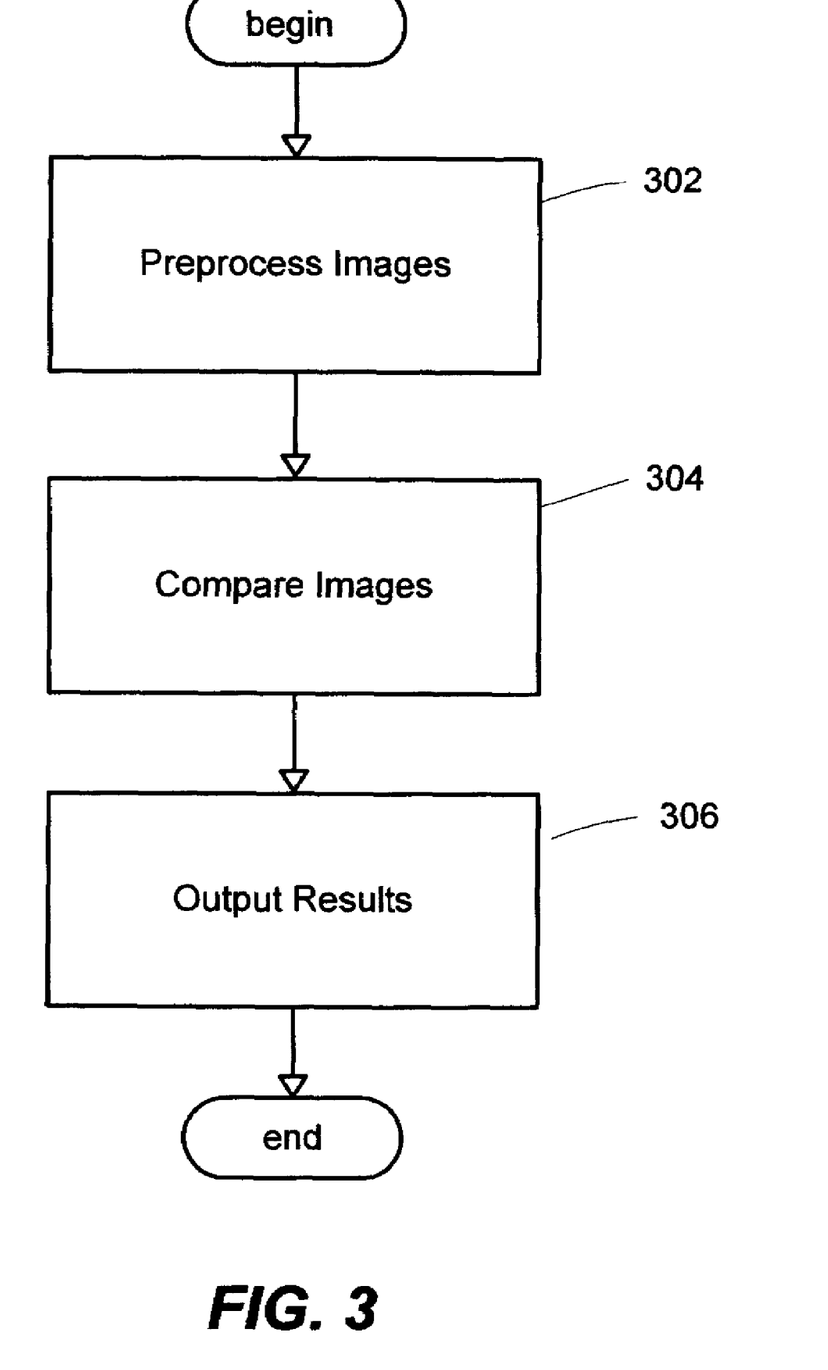
FIG. 3 is a flowchart generally representing the steps undertaken for comparing images using fuzzy image comparison, in accordance with an aspect of the present invention.

FIG. 3 presents a flowchart generally representing the steps undertaken for comparing images using fuzzy image comparison. At step 302, one or more images may be preprocessed. For instance, in one embodiment, a tolerance curve or setting may be set for deciding how to handle the results of comparison. In another embodiment, both a master reference image and a test candidate image may have a filter applied to each of them. In an alternative embodiment, one of the images may have a transform applied. After any images are preprocessed, the images may be compared at step 304. To do so, a pixel of one image may be compared to a corresponding pixel in another image. In one embodiment, a corresponding pixel may be a pixel with the same relative location within the image. Once the images have been compared, the results of the comparison may be output at step 306. In one embodiment, an indication representing that two images are a match may be output, or an indication representing that two images are not a match may be output. In another embodiment, an indication representing that a test candidate passes in its comparison with a master reference image may be output, or an indication that a test candidate image fails in its comparison with a master reference image may be output.

Figure 4:
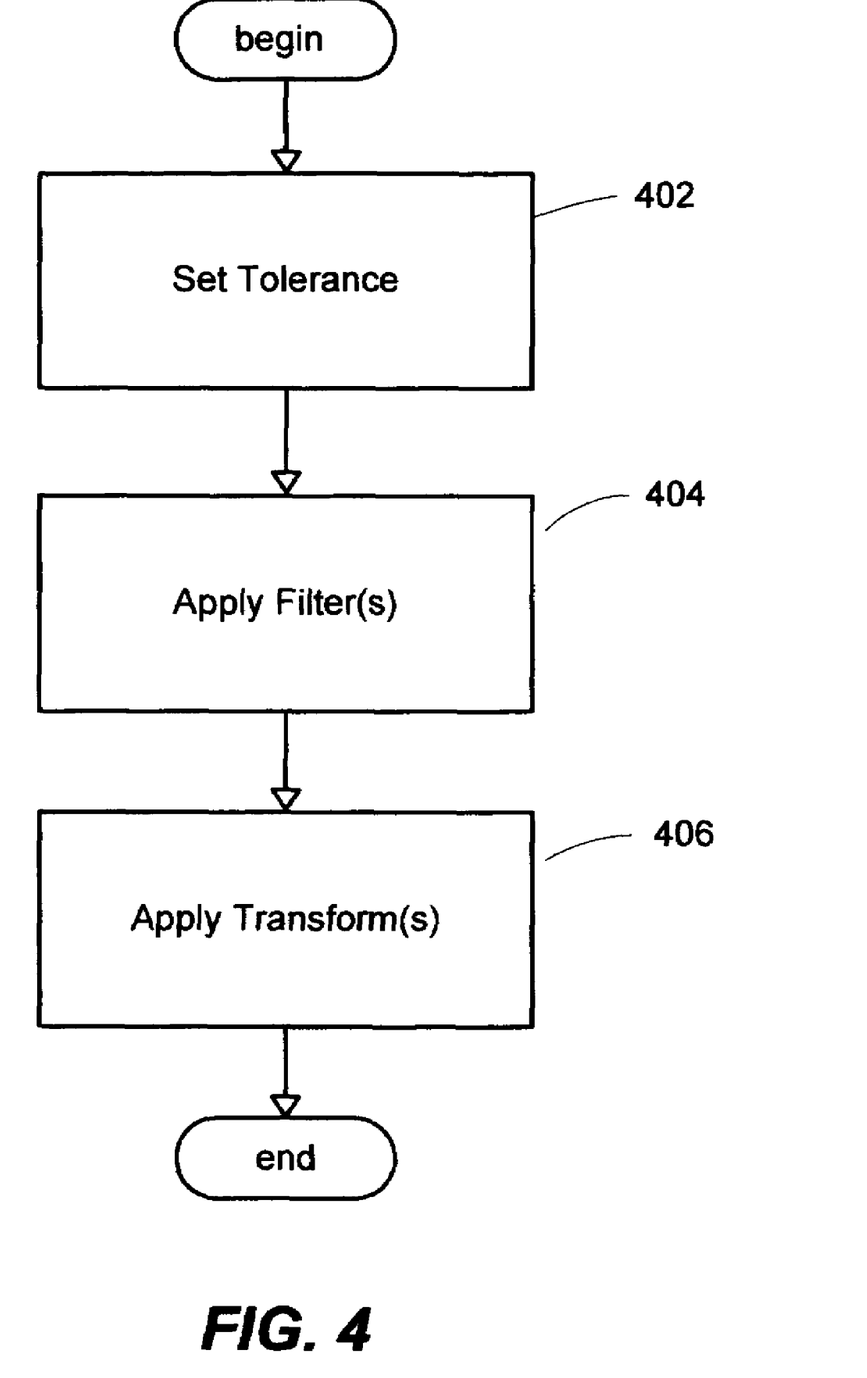
FIG. 4 is a flowchart generally representing one embodiment of the steps undertaken for preprocessing images for fuzzy image comparison, in accordance with an aspect of the present invention.

FIG. 4 presents a flowchart generally representing one embodiment of the steps undertaken for preprocessing images for fuzzy image comparison as indicated at step 302 of FIG. 3. As part of preprocessing images, the tolerance may be set for use in comparing images at step 402. In one embodiment, the tolerance may be set by selecting one of a set of predefined tolerance levels that together may advantageously provide for a fuzzy comparator. Each tolerance level may represent a different degree of tolerance to be used in comparison of the images. For example, a set of tolerance levels may be created such as very fuzzy, tolerant, strict and very strict. This may be particularly useful for processing different types of images such as content images, a series of graphical user interface screens, visual primitives, and so forth. A user may select one of the levels of tolerance to be used in the comparison of image. Alternatively, one of the tolerance levels may be selected automatically based upon the type of an image, such as a content image. In another embodiment, the system may be initialized to a default tolerance level. In general, a tolerance level as used herein means a set of mathematical representations including numbers, equations, graphs, and so forth.

In one embodiment, the set of tolerance levels may be a set of tolerance curves that may be compared to an error histogram formed by comparing corresponding pixels of the images. Furthermore, the tolerance curves may be modulated as a function of a user or time by scaling the tolerance curves to accommodate external variables. Those skilled in the art will appreciate that the tolerance curves may be modulated by other functions.

After the tolerance has been set for use in comparing images at step 402, one or more filters may be applied to the images. For example, a low-pass filter level may be used to process images to remove differences from spurious defects and position offsets. As another example, color depth may be abstracted, for instance, by applying a binarize filter on one or both images. Moreover, the tolerance threshold may be dynamically modified based upon the depth of the master image and compared image. In general, filtering may distribute the high-level error information into the lower frequencies so that the higher level errors are shifted to lower level errors and consequently the higher level errors may fall below the threshold of a tolerance curve. Thus non-meaningful image variations, such as a slight variation in the channels or a position offset in the rendering, may be filtered from true defects.

This may be advantageous for comparing images generated from different implementations of drivers or other types of engines that may result in subpixel rounding errors. For instance, subpixel rounding errors may arise whenever an actual pixel of image is averaged to adjacent picture elements. This may occur if the image positioning on the screen was changed and the pixel did not align with a picture element of the screen. So by using the filtering feature of the image comparator, pixel averaging may be removed and thereby eliminate subtle errors introduced by pixel averaging when performing an exact pixel by pixel comparison. Those skilled in the art will appreciate that the positioning of an image on a screen may be changed for any number of reasons such as to improve visual perception, for performance optimization in rendering the image, and so forth.

Once any filters are applied at step 404, one or more transforms may be applied at step 406. Any type of geometrical transform, such as using a 2D affine transform, may be applied including translation, rotation, and scaling. For example, the resolution of a display screen may be abstracted by applying a geometrical transform such as scaling and interpolation. In one embodiment, a transform may only be applied to the test candidate image. Upon performing any preprocessing and applying any filters and transforms, the images may then be compared as described at step 304 of FIG. 3.

Figure 5:
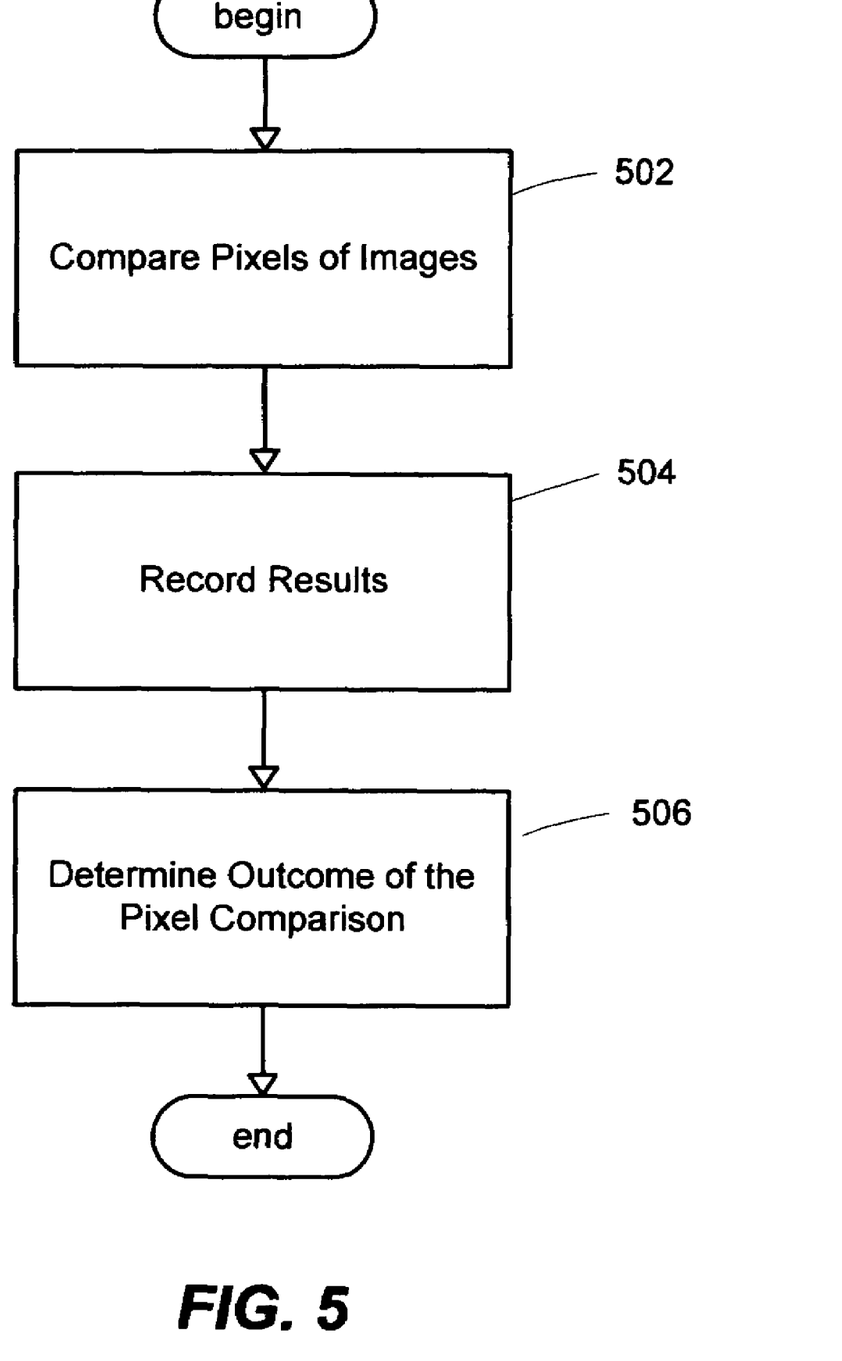
FIG. 5 is a flowchart generally representing an embodiment of the steps undertaken for comparing images, in accordance with an aspect of the present invention.

FIG. 5 presents a flowchart generally representing an embodiment of the steps undertaken for comparing images indicated at step 302 of FIG. 3. At step 502 the pixels of the images may be compared. In one embodiment, the distance between the colors of corresponding pixels may be measured as the sum of the absolute difference between the R, G, B and alpha channels. Other measures of difference, such as the sum of the differences in the channels, may be used in another embodiment. The results of pixel comparisons may then be recorded at step 504.

In one embodiment, the results of pixel comparisons may be recorded in an error histogram. The error histogram may be a 1 to n dimensional array representing a count of a particular percentage of error resulting from comparing pixels. If there is a difference measured between compared pixels of the images, then the difference may be recorded in the histogram by incrementing the column corresponding to that absolute difference. For example, we may construct a histogram of values that range from 0 to a maximum error value normalized into a percentage. If the values are the same, then the difference may be zero. If the percent of error measured exceeds the maximum error value set, then the percent of error may be recorded in the histogram as the maximum error value. In an alternate embodiment, all channels and errors may be normalized to 1 in order to accommodate different pixel representation schemas. For each value of the error which may range between a minimum of 0 and a maximum of 1, the value may be stored into the error histogram. The resulting histogram may then be normalized by the number of pixels so that dimensions of the images do not affect the comparison.

When every pixel has been compared and the result from measuring the difference is added to the appropriate column of the histogram, the columns of the histogram will have a plotted the differences measured between the images. In one embodiment, the process of comparing pixels may terminate if any histogram column grows to exceed a bound such as the set tolerance level or other predefined value.

At step 506, the recorded results may be used to determine the outcome of the pixel comparisons. In one embodiment, a tolerance curve may be compared to the columns of the histogram that represent the differences measured between the pixels of the images. If none of the columns exceed the value of the tolerance curve, the images may be determined to be comparable; otherwise, the images may be determined to have failed to be comparable.

Figure 6:
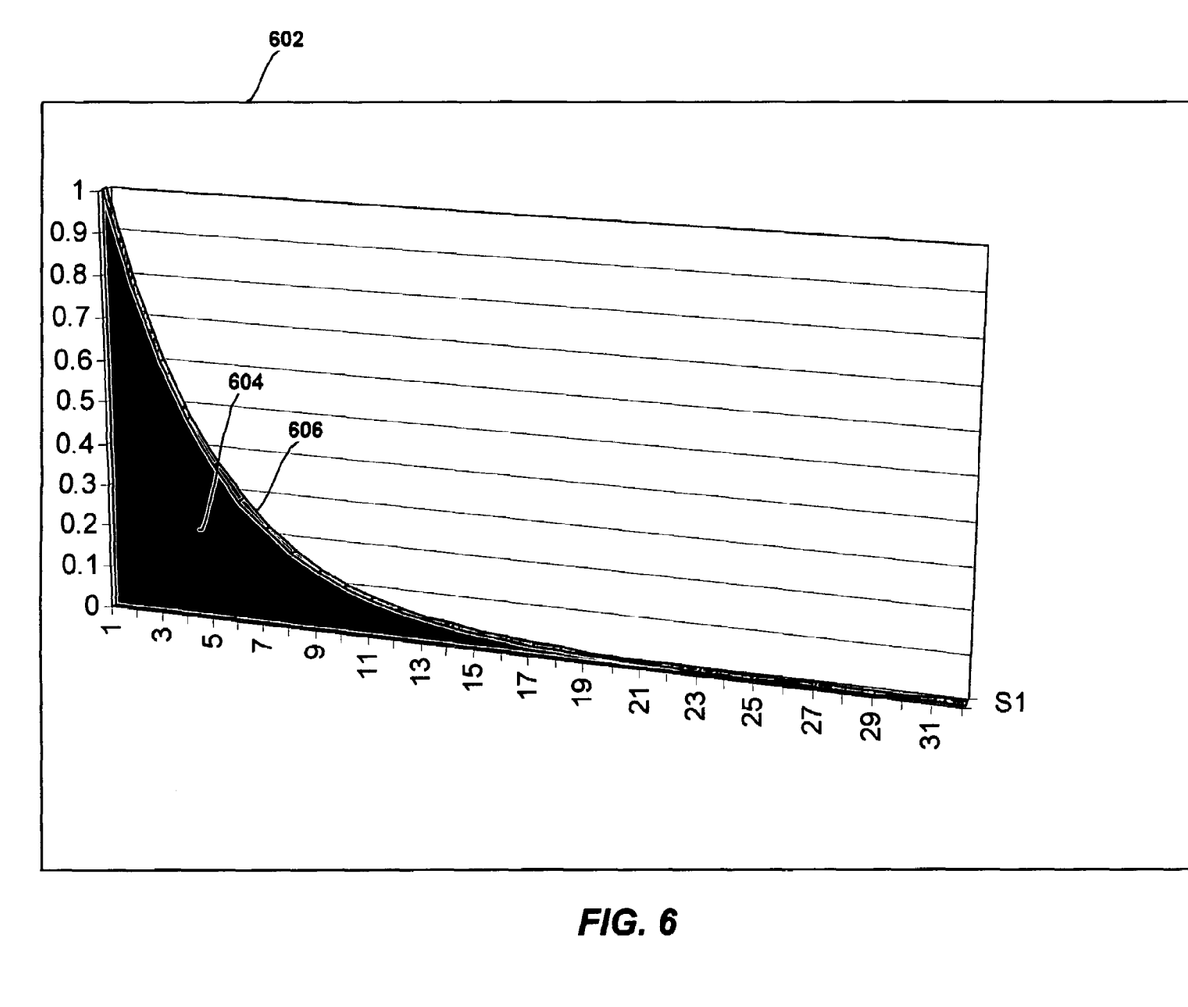
FIG. 6 is an illustration generally representing an example of an error histogram formed by plotting the differences measured between pixels compared from images, in accordance with an aspect of the present invention.

FIG. 6 presents an illustration generally representing an example of an error histogram formed by plotting the differences measured between pixels compared from images. The histogram 602 shows an area 604 of the plotted differences measured between pixel comparisons which lies beneath a tolerance curve 606. In this illustration, the images may be determined to be comparable because none of the area 604 of the error histogram exceeds the values of the tolerance curve 606. However, if the tolerance level were set to be stricter so that the area of the error histogram indicating recorded differences exceeded the values of a stricter tolerance curve, then the images may be determined to have failed to be comparable.

Thus, the degree of tolerance may be selected for processing different types of images. Those skilled in the art will appreciate that with this system and method, one of a set of predefined tolerance levels may be selected that together provide for a fuzzy comparator. One of the numerous advantages of such a fuzzy comparator is that the differences in comparison of images may be adjusted to compensate for any number of defects or noise created from different implementations of the software or hardware. For instance, rendering rounded corners as square corners may no longer be considered a defect when using the present invention. Furthermore, the present invention may be used, for example, to test a new image format by comparing different formats of the same image.

As can be seen from the foregoing detailed description, there is provided a system and method for comparing images using fuzzy image comparison. The system and method may accept any image, including a part of an image or any visual primitive used in a graphical user interface, and perform fuzzy image comparison by selecting a tolerance level, filtering the images, and/or transforming an image. The present invention offers flexible matching and resolution control for comparing any number of different image types. Moreover, the present invention may be used to test various types of image processing engines, such as a renderer, a 2D animation engine using a geometric transform, a composition engine that may render primitives in a pipeline, and so forth. The system and method thus provide significant advantages and benefits needed in contemporary software development and testing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method for comparing images in a computer system, comprising:
    preprocessing images to be compared, including setting an adjustable tolerance level for determining the results of comparing the images;
    using the computing system to perform the following:
    comparing pixels of one of the images with corresponding pixels of another image to detect differences between the pixels compared;
    recording an error histogram representing the detected differences of the pixel of one of the images with the corresponding pixels of the another image, the error histogram comprising a 1 to n dimensional array representing a count of a particular percentage of error resulting from comparing pixels and wherein the difference is recorded by incrementing a column corresponding to that absolute difference;
    determining the outcome of comparing the pixels of the images by comparing the differences detected with the tolerance level set; and
    outputting results of the determination.

2. The method of claim 1 wherein preprocessing the images to be compared further comprises applying a filter to each of the images.

3. The method of claim 2 wherein applying a filter to each of the images comprises suppressing high frequencies in the images.

4. The method of claim 2 wherein applying a filter to each of the images comprises enhancing low frequencies in the images.

5. The method of claim 1 wherein preprocessing the images to be compared comprises performing a geometrical transform on one of the images.

6. The method of claim 5 wherein performing a geometrical transform comprises performing a 2D affine transform.

7. The method of claim 1 wherein setting an adjustable tolerance level for determining the results of comparing images comprises selecting one of a set of predefined tolerance levels.

8. The method of claim 7 wherein selecting one of a set of predefined tolerance levels comprises selecting one of a set of predefined tolerance curves.

9. The method of claim 7 wherein selecting one of a set of predefined tolerance levels comprises initializing the adjustable tolerance level to a default tolerance level.

10. The method of claim 1 wherein setting an adjustable tolerance level for determining the results of comparing images comprises automatically selecting one of a set of predefined tolerance levels based upon an image type of one of the images.

11. The method of claim 1 wherein comparing pixels of one of the images with corresponding pixels of another image to detect differences between the pixels compared comprises measuring the distance between the colors of the pixels of the images as the sum of the absolute difference between the R, G, B and alpha channels.

12. The method of claim 1 wherein comparing pixels of one of the images with corresponding pixels of another image to detect differences between the pixels compared comprises recording the result of the differences between pixels.

13. The method of claim 12 wherein recording the result of the differences between pixels comprises recording the result of the differences between pixels in a histogram.

14. A computer-readable storage medium having computer-executable instructions for performing the method of claim 1.

* * * * *